Feb. 21, 1956  W. J. GREER  2,735,944
APPARATUS FOR DETERMINING DENSITY OF FLUIDS
Filed Oct. 13, 1951
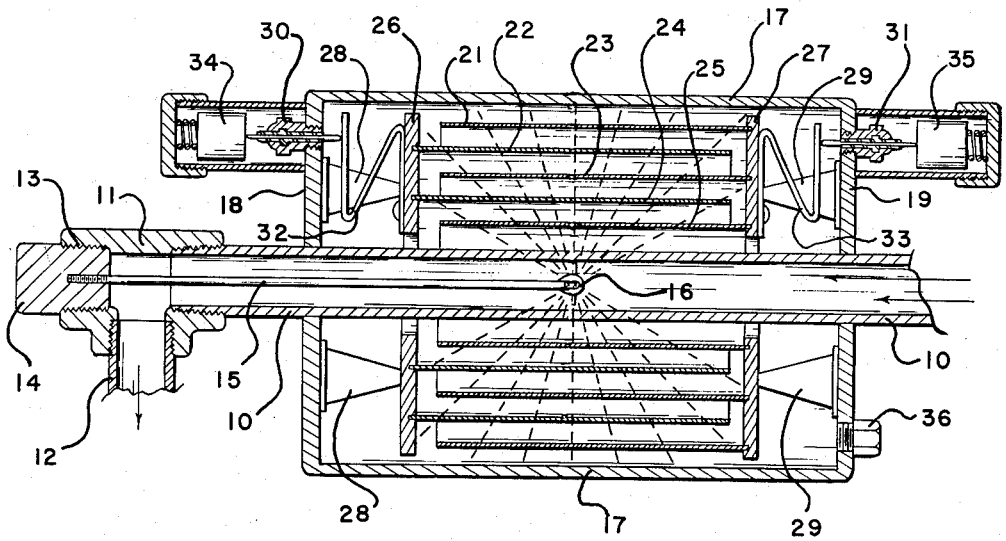
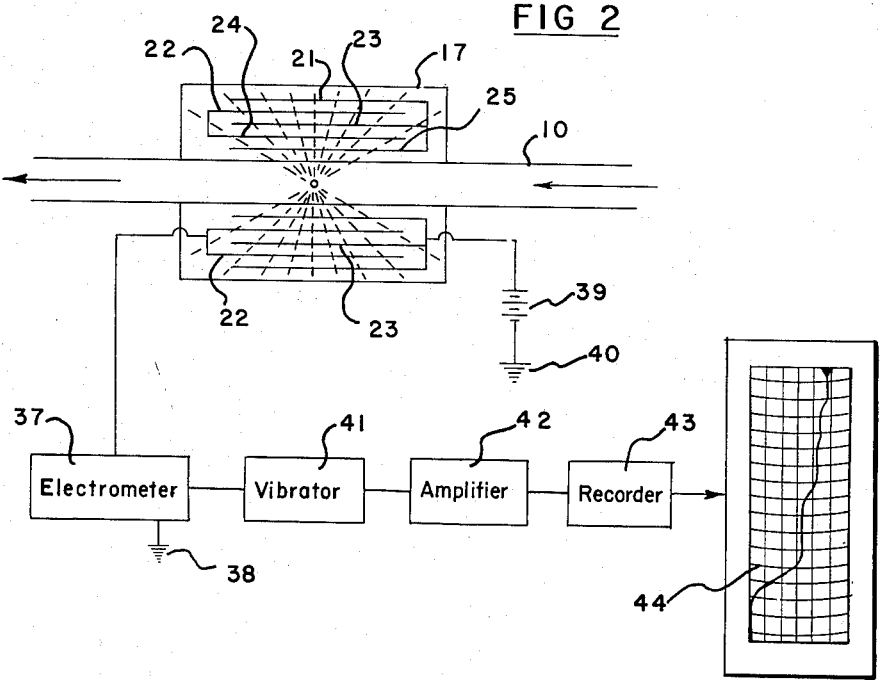
INVENTOR
WALTON J. GREER
BY Earl Babcock,
ATTORNEY

United States Patent Office 2,735,944
Patented Feb. 21, 1956

2,735,944
APPARATUS FOR DETERMINING DENSITY OF FLUIDS

Walton J. Greer, Houston, Tex., assignor to Halliburton Oil Well Cementing Company, Duncan, Okla.

Application October 13, 1951, Serial No. 251,156

4 Claims. (Cl. 250—43.5)

This invention relates to apparatus for determining density or specific gravity of fluids and more particularly to gamma radiation apparatus suitable for measuring the density of heavy fluids flowing under pressure through a conduit.

In the drilling of oil wells by the rotary system, heavy mud is employed. Also, during certain stages of the drilling, casing is cemented in place in the well. It is very important to know at all times the density of the mud or cement slurry being pumped into a well. Sometimes a low pressure or "thief" formation is encountered and then a mud or slurry much lighter than normal must be employed. On the other hand, care must be exercised to keep the well from blowing out and this sometimes requires the use of exceedingly heavy mud or slurry.

Various attempts have been made, heretofore, to provide apparatus for determining the density of mud and slurry as these fluids are being pumped into the well, but without any marked success. The fluids are often under a pressure of thousands of pounds per square inch and the flow is not always uniform, so that weighing devices and those using pressure gauges, while sometimes satisfactory, have not been generally adopted. Moreover, devices heretofore proposed have not always been rugged and capable of withstanding the hard usage to which all oil field equipment is often subjected.

It has heretofore been proposed to determine the density or specific gravity of a fluid in a conduit by subjecting it to a source of radiation, such as gamma rays, and determining or measuring the amount of scattering of the rays in the fluid. See the United States patent to Hare, No. 2,304,910, granted December 15, 1942, for example.

It has long been known that the density of a medium subjected to gamma radiation, or like radiation, bears some relation to the absorption, dissipation or capture of the rays. By determining the magnitude of such absorption or dissipation, an indication can be obtained as to the density of the material, at least relatively.

The present invention makes use of these known principles and involves an application of them to the particular problem of measuring or comparing the density of heavy cement slurry or mud flowing through a conduit under high pressure. The particular design of the apparatus is such that fluid flowing in a conduit is subjected to gamma radiation from a source itself located within the conduit, while the detector, such as an ionization chamber or Geiger counter chamber, is located outside or around the conduit. The design is such that the detector is particularly responsive to changes in density of the fluid in the conduit and the recorder or indicator associated therewith may be calibrated in units, such as pounds per gallon, and respond over a considerable range with remarkable fidelity. At the same time the unit is very rugged. Also it is believed to be far more efficient than any heretofore proposed for the determination of density of fluids in conduits.

The objects of the invention will be apparent from the following description of the invention, taken in connection with the accompanying drawings in which:

Fig. 1 is a vertical cross-sectional view of a fluid conduit with gamma ray apparatus constructed in accordance with the invention incorporated therein and associated therewith.

Fig. 2 is a diagrammatic illustration of the measuring system which may be used in conjunction with the apparatus of Fig. 1 to obtain a record of changes in density of fluid in the conduit.

Referring to the drawing in detail and first to the apparatus of Fig. 1, it will be seen that a horizontal conduit is there shown at 10 connected by an elbow 11 to a vertical conduit 12. Fluid such as cement slurry or mud may be flowing through this conduit system, in the direction of the arrows, from a pump not shown. This conduit system may be made of steel pipe or the like capable or withstanding high pressure.

The elbow 11 is of special construction, having threads 13 to support a plug 14 to which is attached a tube 15 which carries at its forward end a capsule or housing 16 containing a source of gamma rays, such as radium. The source 16 is substantially centrally located within the conduit 10 so that the fluid may flow around the source substantially on all sides.

The detector portion of the apparatus is located outside of the conduit 10 and includes means forming a closed chamber. This is provided by an outer metallic cylinder 17 and metallic circular end plates 18 and 19. Within the cylinder 17 are a number of additional metallic, concentrically disposed, cylinders or grids, designated 21, 22, 23, 24 and 25, supported on disks 26 and 27, which are in turn supported on the end plates 18 and 19 respectively by stand-off insulators 28 and 29.

It will be seen that alternate grids are connected together. Thus grids 21, 23 and 25 are connected to and supported by disk 27 and insulators 29 while grids 22 and 24 are connected to and supported by disk 26 and insulators 28. The outer cylinder 17 and the conduit 10 could, if desired, form part of the grid or electrode system, but in the form shown they are not electrically connected to the grids.

To make electrical connections to the grids from the exterior of the closed chamber provided by cylinder 17, while still maintaining hermetical seal, terminal members 30 and 31 are provided, these being similar in structure to automobile spark plugs. Terminal member 30 is mounted in a hole in end plate 18 and makes electrical connection with disc 26 through bent leaf spring 32 while terminal member 31 is motunted in a hole in end plate 19 and makes electrical connection to disk 27 through bent leaf spring 33. The terminal member 30 with its connector device 34 provides means for connecting grids 22 and 24 to an electrometer as shown in Fig. 2, while the terminal member 31 and its connector device 35 provides means for connecting grids 21, 23, and 25 to a battery as shown in Fig. 2.

An important feature of the present invention resides in the fact that the source of gamma radiation 16 may be located centrally of the closed chamber provided by the cylinder 17 and the end plates 18 and 19. The fluid to be tested or measured passes immediately around the source 16 and the rays radiating therefrom and passing through the fluid, as illustrated by the dashed lines, are bound to strike, to a very large measure, the detector provided within the closed chamber.

In accordance with known practice, the closed chamber may be filled with argon or other inert gas, a connection plug 36 being provided for this purpose. The grids within the chamber serve as electrodes either of an ionization chamber or of a Gieger-Mueller counter depending upon what electrical system is employed, what pressure of gas is used in the chamber, the potential across the electrodes and like known factors.

As shown diagrammatically in Fig. 2, an ionization chamber recording circuit may be used with the detector apparatus of Fig. 1. Thus the grids 22 and 24 within the chamber provided by cylinder 17 may be connected to an electrometer 37, grounded at 38. The grids 21, 23, and 25 may be connected to a battery 39 grounded at 40. Suitable electrical means, such as a vibrator or "de-rectifier" 41 to convert the direct current voltage of the electrometer 37 to alternating current, an alternating current amplifier 42 and a recorder 43 may be employed to make a chart or continuous record as shown at 44 of variations in gamma radiation received by the grids or electrodes within the chamber. By suitable calibration, the chart may be used to determine actual values of density of the fluid passing through the conduit 10 and the chart 44 is representative of a graph in which density in pounds per gallon is plotted against time. The system is primarily designed for measuring the density of heavy fluids such as drilling mud or cement slurry but is capable of determining or at least comparing the density of other fluids as well. It is also capable of use where the fluids being examined are not under high pressure, although it will be seen that a particular advantage in the use of a chamber outside a conduit with the source of radiation inside the conduit makes it possible to use a heavy strong conduit, such as that shown at 10, without losing the effects of the radiation. Since the rays rapidly disperse as the distance from the source increases, it is important to have the material being examined as close to the source as possible. At the same time it is desirable to mark the effects upon the rays to as great an extent as possible. The structure of the present invention serves these purposes to a large degree.

It should also be noted that sources of other rays than gamma rays, such as X-rays, could be used. At the present time, however, it is believed that the density of heavy fluids such as cement slurry and drilling mud are best determined or compared by using gamma rays. Actual tests of an instrument constructed in accordance with the present invention demonstrate that actual values of density of cement slurry and drilling mud can be determined with sufficient accuracy to have commercial value.

While only one embodiment of the invention has been shown and described herein, it is obvious that various changes may be made without departing from the spirit of the invention. The invention should not be regarded as limited, therefore, except by the scope of the claims.

I claim:
1. Apparatus for determining the density of fluid including a conduit for containing the fluid, a source of gamma radiation mounted in the conduit in such position that the fluid may flow around the source substantially on all sides, means forming a closed chamber outside of said conduit and in such position that the source of gamma radiation is substantially in the center thereof, and means including electrodes mounted in the closed chamber for detecting radiations from the source within the conduit.

2. The apparatus of claim 1 in which the means forming the closed chamber is cylindrical in shape and in which the electrodes each consist of one or more metal cylinders.

3. The apparatus of claim 1 in which the means forming the closed chamber is cylindrical in shape and in which the electrodes each consist of a plurality of metal cylinders concentrically disposed.

4. Apparatus for determining the density of heavy fluid such as cement slurry or drilling mud while under pressure including a conduit circular in cross section adapted to convey the fluid and withstand the pressure, a source of gamma radiation mounted in the conduit in such position that the fluid may flow around the source substantially on all sides, means forming a closed chamber outside of said conduit concentrically disposed with respect thereto and near said source, and means including electrodes mounted in said closed chamber for detecting radiations from the source within the conduit.

References Cited in the file of this patent

UNITED STATES PATENTS

| | | |
|---|---|---|
| 1,808,709 | Blake | June 2, 1931 |
| 2,304,910 | Hare | Dec. 15, 1942 |
| 2,315,819 | Schlesman | Apr. 6, 1943 |
| 2,374,197 | Hare | Apr. 24, 1945 |
| 2,458,093 | Muskat et al. | Jan. 4, 1949 |